United States Patent [19]

Midkiff

[11] Patent Number: 4,979,536
[45] Date of Patent: Dec. 25, 1990

[54] PORTABLE TRUCK TIRE WASHING APPARATUS

[75] Inventor: David G. Midkiff, Falls Church, Va.

[73] Assignee: Marking Designs Inc., Fredericksburg, Va.

[21] Appl. No.: 507,921

[22] Filed: Apr. 12, 1990

Related U.S. Application Data

[63] Continuation-in-part of Ser. No. 331,984, Apr. 3, 1989, Pat. No. 4,917,125.

[51] Int. Cl.$^5$ .............................................. B60S 3/04
[52] U.S. Cl. .................................. 134/123; 414/534; 414/537
[58] Field of Search ............ 134/45, 123; 15/DIG. 2, 15/53 B; 414/533, 534, 537

[56] References Cited

U.S. PATENT DOCUMENTS

| | | | |
|---|---|---|---|
| 118,085 | 8/1871 | Weston | 134/123 |
| 620,321 | 2/1899 | Holcomb | 104/72 |
| 820,463 | 9/1906 | Sutherlin | 134/123 |
| 1,338,714 | 5/1920 | Wagner | 15/53 B X |
| 1,412,732 | 4/1922 | Young | 15/53 B X |
| 1,467,994 | 9/1923 | Bohland | 134/123 |
| 1,479,841 | 1/1924 | Stover | 15/53 B X |
| 1,484,071 | 2/1924 | Memmen | 134/45 |
| 1,487,062 | 3/1924 | Hohl | 134/123 X |
| 1,651,045 | 11/1927 | Smith | 134/123 |
| 1,694,197 | 12/1928 | Woodling | 134/45 |
| 1,909,869 | 3/1933 | Randrup | 15/53 B X |
| 2,716,767 | 9/1955 | Davis | 15/53 B X |
| 2,718,650 | 9/1955 | Haverberg | 15/53 B X |
| 2,761,170 | 9/1956 | Bonneau | 134/45 X |
| 2,797,006 | 9/1957 | Thompson | 15/DIG. 2 |
| 2,814,825 | 12/1957 | Guthrie, Jr. et al. | 134/123 X |
| 2,837,759 | 6/1958 | Haverberg | 134/123 X |
| 2,889,946 | 6/1959 | Holsclaw | 414/534 |
| 2,981,266 | 4/1961 | Tamburri | 134/123 X |
| 2,997,048 | 8/1961 | Gertkerr et al. | 134/123 X |
| 3,058,133 | 10/1962 | Haverberg | 15/53 B X |
| 3,179,117 | 4/1965 | Gibson et al. | 134/123 X |
| 3,361,143 | 1/1968 | Daum et al. | 134/45 |
| 3,593,726 | 7/1971 | Lockhart | 134/45 |
| 3,675,798 | 7/1972 | Carder et al. | 414/534 X |
| 3,681,805 | 8/1972 | Shelstad et al. | 134/45 X |
| 3,698,029 | 10/1972 | Pulliam | 134/123 X |
| 3,772,723 | 11/1973 | Krimm | 15/DIG. 2 |
| 3,903,559 | 9/1975 | Kuster et al. | 15/DIG. 2 |
| 4,305,694 | 12/1981 | Chan | 414/537 X |

FOREIGN PATENT DOCUMENTS

| | | | |
|---|---|---|---|
| 1921891 | 3/1970 | Fed. Rep. of Germany | 134/45 |
| 2724593 | 12/1978 | Fed. Rep. of Germany | 15/53 B |
| 0172858 | 10/1982 | Japan | 134/123 |
| 1442258 | 7/1976 | United Kingdom | 134/123 |
| 2147859 | 5/1985 | United Kingdom | 15/53 B |

*Primary Examiner*—Philip R. Coe
*Attorney, Agent, or Firm*—Sughrue, Mion, Zinn, Macpeak & Seas

[57] ABSTRACT

A portable tire washing apparatus is mounted on a towable trailer bed or on a platform and has drivable rollers for rotating truck tires while they are sprayed by jets of water. Additional roller assemblies or bumpers are provided to prevent sideway movement of the tires. The platform-mounted apparatus may be installed on level ground or in a depression dug in the ground.

15 Claims, 11 Drawing Sheets

PORTABLE TRUCK TIRE WASHING APPARATUS

This application is a division and a continuation-in-part of Application No. 07/331,984, filed Apr. 3, 1989, and now U.S. Pat. No. 4,917,125.

BACKGROUND OF THE INVENTION

1. Field of the Invention

This invention relates generally to the field of machines for washing vehicle tires mounted on wheels which, in turn, are mounted on axles of a vehicle and, more particularly, to an apparatus for washing mud and dirt from the tires of construction trucks as they are leaving a construction site and before entering upon the pavement of a road.

2. Description of the Prior Art

When a construction truck leaves a construction site, especially muddy sites, dirt and mud tend to adhere to the truck's tires, and to become embedded in the treads of the tires. When the truck then drives onto a paved road, there is left on the pavement a trail of mud and dirt. Many jurisdictions now require contractors to remove such mud and dirt from the pavement and also to comply with strict sediment control requirements, and subject contractors to penalties for not doing so, as debris o the pavement is environmentally inconsistent and presents to vehicular traffic. Some contractors attempt to solve the problem by manually sweeping the pavement to place it in its original condition.

Even though there are many known prior art devices for cleaning vehicles in general, and vehicle wheels and tires in particular, they are not particularly efficient in washing debris from the tires of a construction truck as it leaves a construction site and before it enters upon a paved road.

U.S. Pat. No. 1,467,994 discloses a drive-through in-ground washing bowl which has ribs on the submerged floor, itself, in order to help vibrate and remove mud from a vehicle's wheels. Patent No. 620,321 shows a similar apparatus, but for use as a roller-coaster, and having undulations in the submerged part of a track.

In U.S. Pat. Nos. 3,179,117 and 3,903,559, the vehicle whose wheels are being cleaned is moved crosswise of a trailer bed on which a cleaning apparatus is mounted. In U.S. Pat. No. 3,903,559, the cleaning apparatus operates on an axle's worth of tires at a time, the apparatus rotates the truck's tires while the truck driver has the truck transmission in neutral, the device sprays water on the tires, and rollers driving the tires are raised after the truck has driven into position and, then, are lowered in order to permit the truck to be driven further forward.

The following U.S. patents are of further background interest, and several show the broad concept of an above-ground trough-type tire cleaning device in which a vehicle, while its tires are being cleaned, is supported on an elevated grid or the like located above the bottom of the trough: U.S. Pat. Nos. 118,085; 820,463; 1,338,714; 1,412,732; 1,484,071; 1,487,062; 1,479,841; 1,651,045; 1,694,197; 1,909,869; 2,716,767; 2,718,650; 2,797,006; 2,814,825; 2,981,266; 2,997,048; 3,058,133; 3,593,726; 3,681,805; 3,698,029 and 3,772,723.

SUMMARY OF THE INVENTION

The primary object of the invention is to provide an improved portable tire-washing apparatus which is particularly adapted to washing the tires of construction trucks leaving a construction site and entering onto a paved road.

Another object of the invention is to provide an improved portable, platform-mounted truck tire washing apparatus which can be moved from site to site for washing the tires of construction trucks.

Another object of the invention is to provide an improved portable, trailer-mounted truck tire washing apparatus which can be moved from site to site for washing the tires of construction trucks.

A further object is to provide such a portable apparatus having guides for preventing sideway movement of the tires during a washing operation.

Still another object is to provide such a portable apparatus having tire-cradle assemblies including drivable tire-rotating rollers arranged in a configuration conforming to the curvature of the tires.

Another object is to provide the surfaces of such rollers with serrations designed to fit into the treads of the tires.

Another object is to provide such a portable tire washing apparatus with protection gates for enclosing the area containing the cradle assemblies during a washing operation.

Another object is to provide such a portable tire washing apparatus with pivotable entrance and exit ramps.

Another object is to provide such an apparatus in which the ramps are removable.

Another object is to provide such ramps with pivotable nose sections which are hydraulically operable between a travel position and an operational position.

Another object is to provide each ramp in the form of pivotably connected subsections, one of which can be pivoted upwardly to form a protection shield during a tire-washing operation.

Another object is to provide such a portable tire washing apparatus with means for recycling the washing water, flushing debris from the apparatus, and removing the debris.

Another object is to provide such a portable apparatus with means for providing washing water either from an on-board water supply or from an external source.

Still another object is to provide such a portable tire-washing apparatus with leveling devices.

Another general object of the invention is to provide a portable tire-washing apparatus which is mounted on a trailer which can be towed from site to site, or which is mounted on a platform adapted to rest on level ground or in a shallow depression in the ground.

DETAILED DESCRIPTION OF PREFERRED EMBODIMENTS

The apparatus illustrated in FIGS. 1-6 is the in-ground embodiment of the invention in the form of a tire washing apparatus which, by its design, maintains wash Water turbidity while, at the same time, allowing construction truck tires to be cleansed by a natural water motion which is directed and controlled by both the shape of the sides the apparatus and also the steel grates on which the tires ride. This water motion also helps direct suspended sediment into the chambers formed under the steel grates. The special design of the apparatus not only provides the necessary cleansing motion of the water, but also helps control the tidal effect created by the passage of trucks through the apparatus which is generally designated by the reference numeral 200 in FIGS. 1, 2 and 3.

More specifically, formed in a pit 202 in the ground 204 is a concrete trough 206 having a planar, slanted central portion 208, a downwardly inclined entrance portion 210 and an upwardly inclined exit portion 212. Trough 206 has specially designed sidewalls 214 and 216, each of which has formed on its inner surface a vertically straight upper portion 218, an inwardly directed convex portion 220 an intermediate straight portion 222, a horizontal portion 224 and a lower vertical portion 226. The convex portions tend to force sloshing water toward the center. A first longitudinally extending series of grates 228 are supported at their opposite transverse ends on horizontal wall portion 24 and a central, longitudinally extending concrete divider member 230 which tends to reduce sideways sloshing of the water. A second series of longitudinally extending grates 232 are also supported on the opposite horizontal portion 224 and on the central member 230. The grates 228 and 232 are pivotably connected by a pivot 240 mounted in a bracket 242 which is fixed by anchors 243 on the horizontal portion 224 of each of the sidewalls 214 and 216 of the trough. Each pivot pin also passes through a bracket 245 fixed to the underside of each grate. When it is necessary to remove accumulated sediment from the bottom of the trough, the grates 228 and 232 are pivoted upwardly and outwardly to the phantom line positions shown in FIG. 4.

The trough is filled from a water source (not shown) through a control valve 250 and an inlet line 252 which passes through the side wall 214. Sediment-carrying water is removed through a lower drain pipe 254 and another control valve 256 by gravity. For this purpose, and as viewed in FIG. 4, the top surface of the floor 206 slants slightly to the left towards drain pipe 254. In the bottom of the central dividing member 230 are through pipes 260 which permit water to flow from the chambers below the grates 232 to the drain pipe 254.

In operation, the trough is filled to the approximate water level 262 above the grates, which are formed of a steel mesh, and above the height of the tire annulus. When a truck 270 passes over the grates, the spaces in the mesh of the grates cause a slight vibration and a flexing of the truck's tires 272, thereby facilitating the removal of mud and dirt from the tires. The motion of the truck through the trough causes a tidal effect which aids in the washing action of the tires. The convex shape of the inner surface of the sidewalls reduces the transverse wave motion of the water.

Because the water level 262 is above the grates 228 and 232, the truck tires tend to be always moving through relatively clean water, as the sediment-containing water gravitates to the lower chambers and to the floor of the trough where it can be removed through the drain pipe 254.

Figures 1, 5:
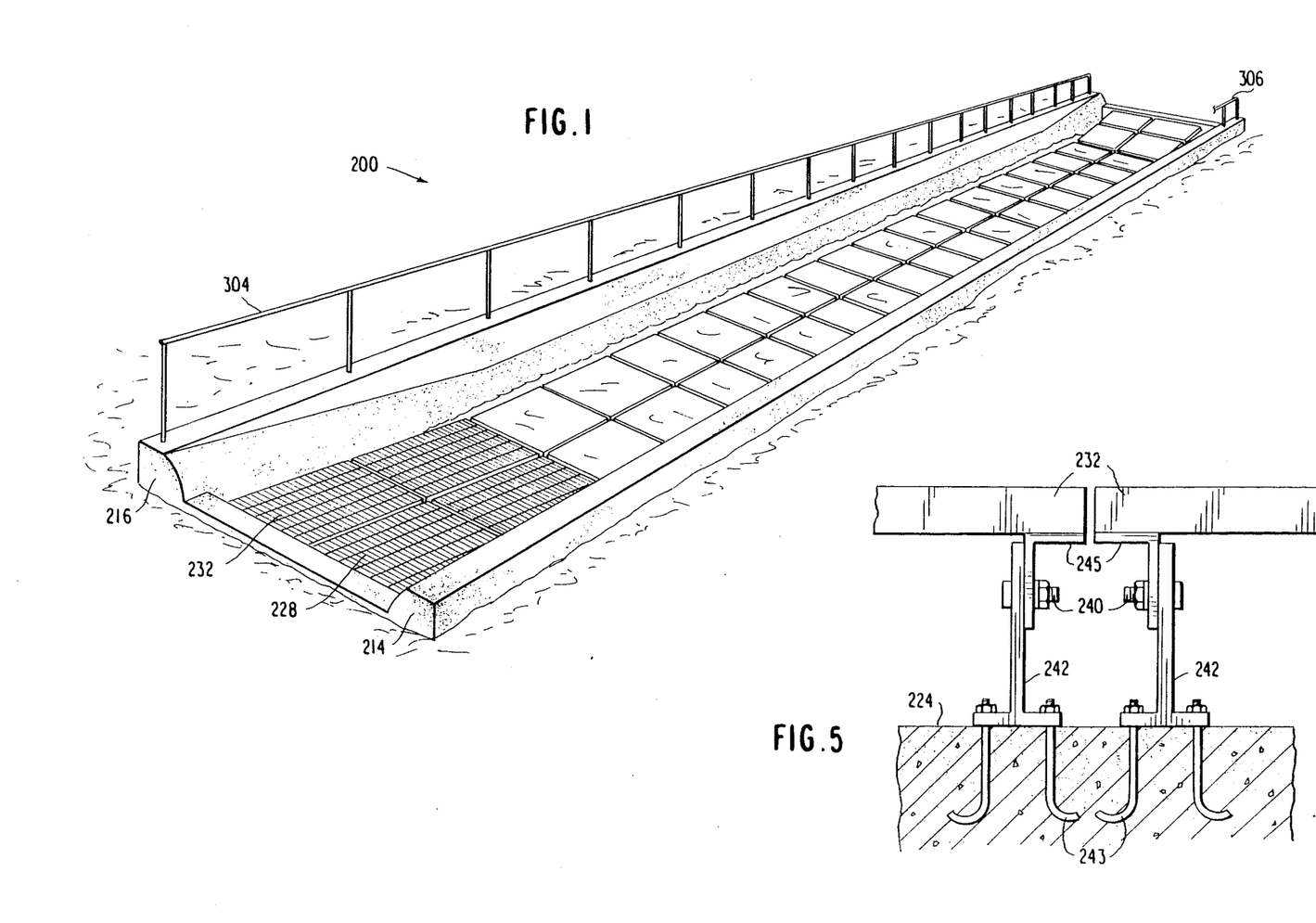
FIG. 1 is a perspective view of a first embodiment of the invention.
FIG. 5 is a cross-sectional view taken along line 5—5 of FIG. 4.
Figure 2:
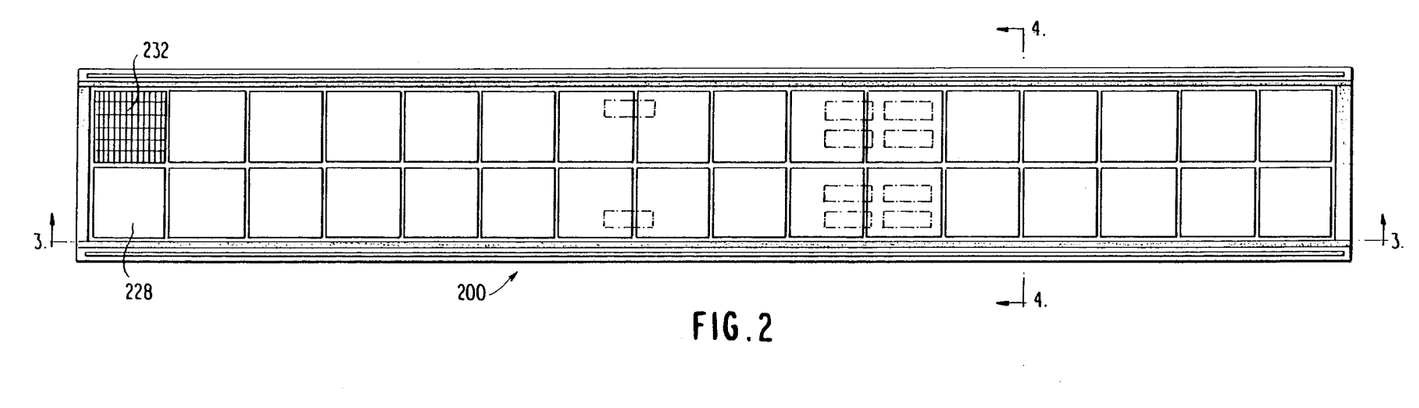
FIG. 2 is a plan view of the first embodiment.
Figure 3:
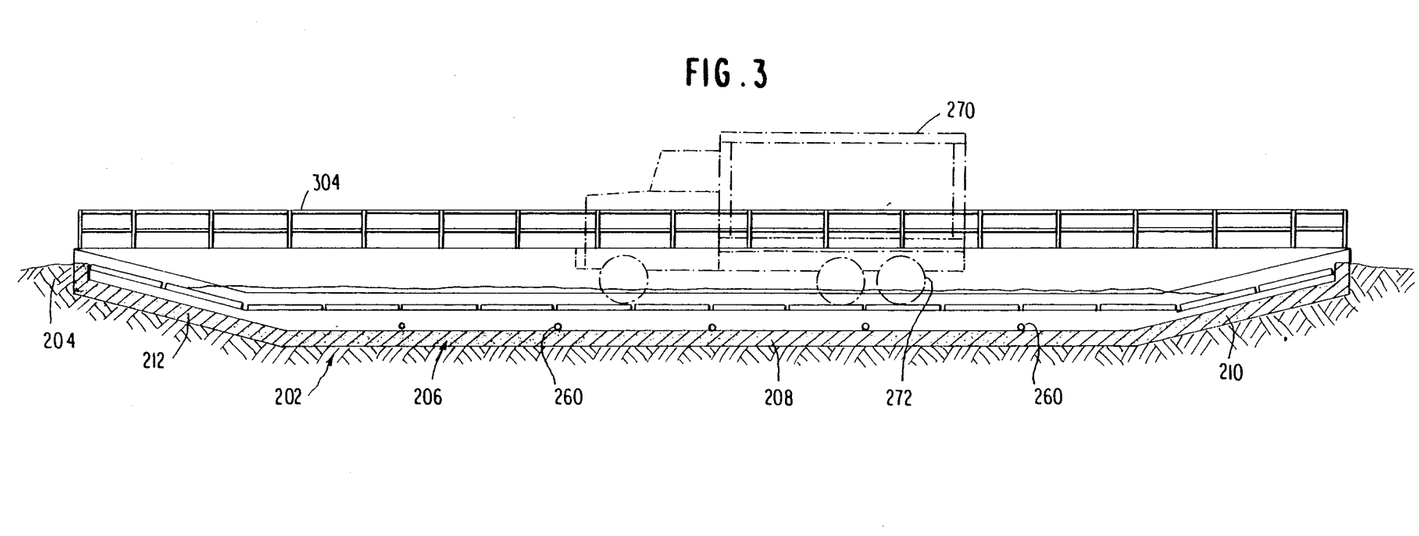
FIG. 3 is a cross-sectional view taken along line 3—3 of FIG. 2.
Figures 4, 6:
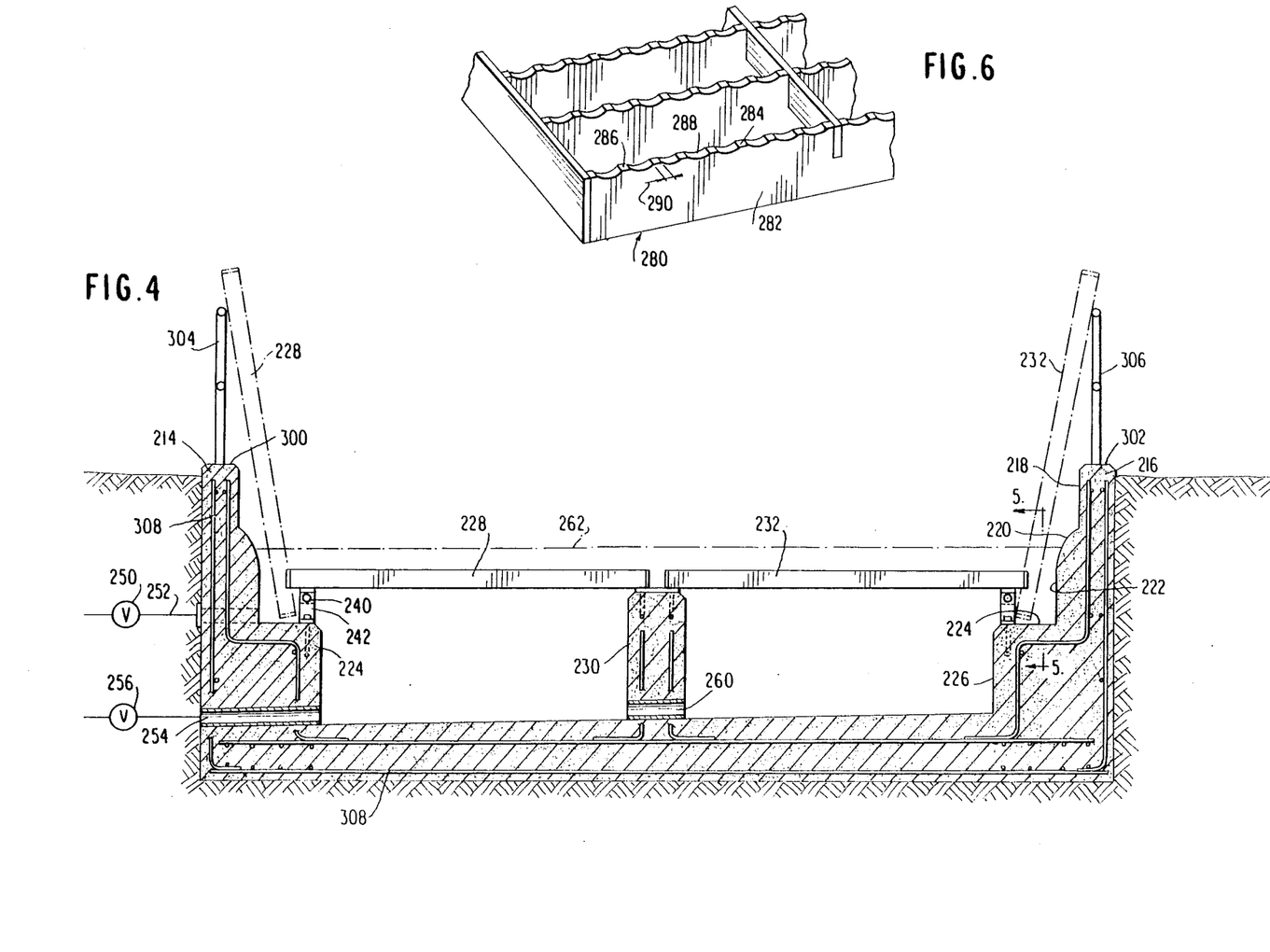
FIG. 4 is a cross-sectional view taken along line 4—4 of FIG. 2.
FIG. 6 is a perspective view of an alternative grate usable as part of the invention.

FIG. 6 is a perspective view of another form of grate which performs even greater cleansing action of the tires. This grate 280 has transverse members 282 each of which has a tire-contacting upper surface 284 which is serrated, i.e., has upwardly directed projections 286 separated by recesses 288. These projections have a width dimension 290 which is designed to fit into the treads of typical truck tires and thereby force out mud which is embedded in the tire treads, as the truck passes over the series of transverse members 282. A typical width dimension 290 is $\frac{3}{8}''$ to $\frac{1}{2}''$. Since the serrations are tapered inwardly in the upward direction, and since the flexing of the tires tends to open the treads, this width dimension is not particularly critical so long as it is not wider than the width of treads encountered. The transverse spacing of the serrations is not critical so long as they are placed close enough together that at least one serration is likely to engage each tread of a truck tire.

The construction of the apparatus 200 is quite sturdy, since typical construction trucks may weigh 80,000 pounds or more.

Fixed to the upper edges 300 and 302 of the two sidewalls 214 and 216 are metal guard rails 304 and 306 against which the grates 228 and 232 rest in their cleaning position. Safety chains are fixed along the top rail for the purpose of restraining the grates during cleaning of the trough. The concrete is reinforced by suitable reinforcing rods 308.

Thus, this invention eliminates the need for sweeping pavements and also provides the normally required sedimentation control, while at the same time enhancing the tire washing action because the truck tires are riding on the grates in the relatively clean water above the grates. The sediment-carrying water falls by gravity to the grates and accumulates as sedimentation at the bottom the trough. As described above, the grates are periodically removed by pivoting them upwardly and outwardly so that accumulated sedimentation can be pumped or otherwise removed from the floor of the trough.

FIGS. 7–11 illustrate a second embodiment of the invention.

Figure 7:
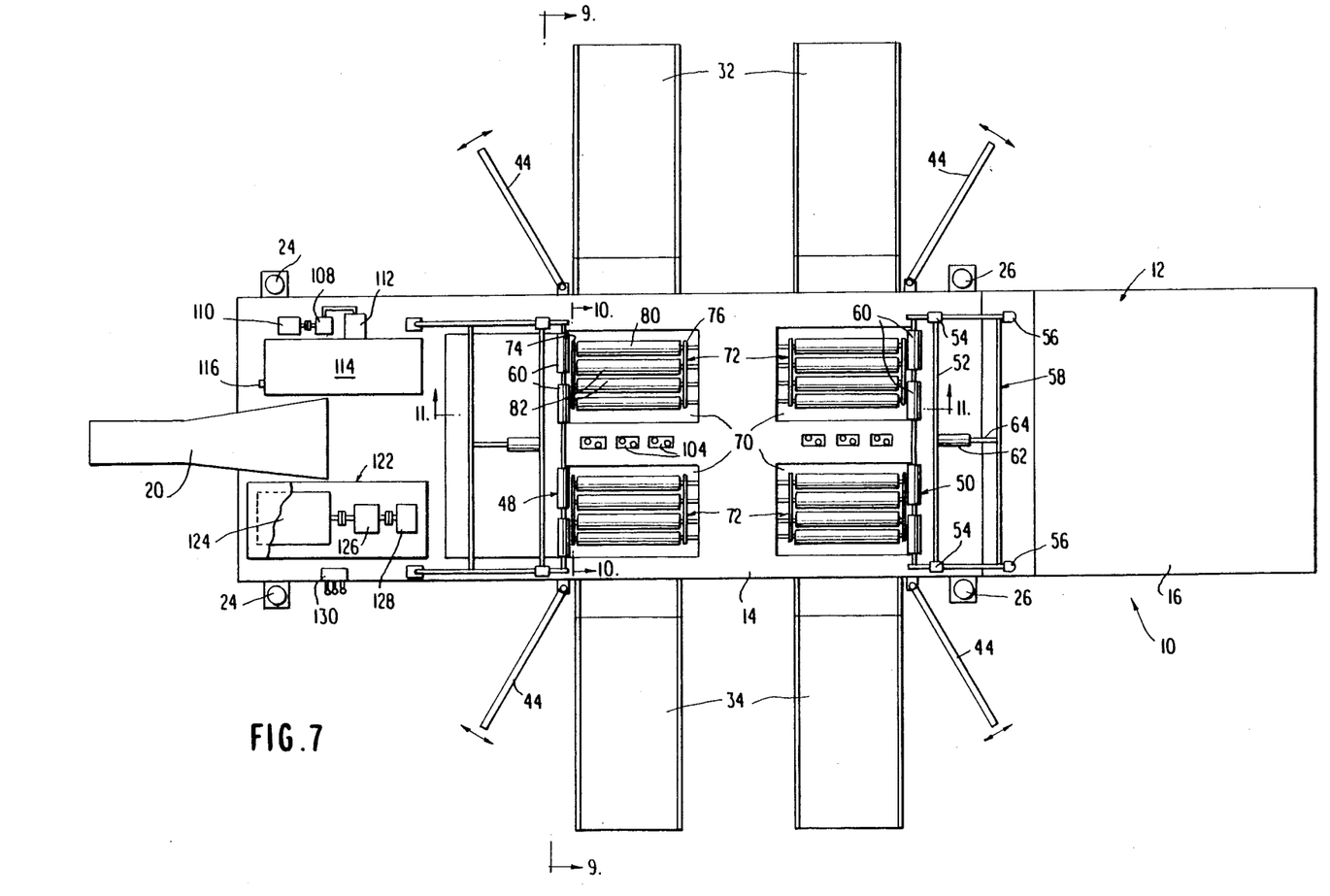
FIG. 7 is a top plan view of a second embodiment including a portable tire washing apparatus.
Figure 8:
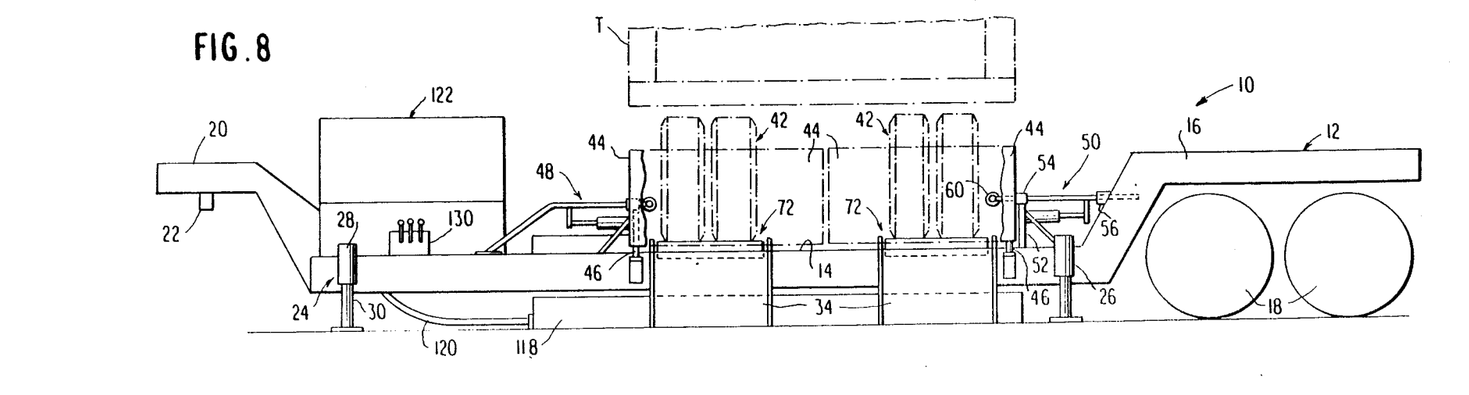
FIG. 8 is a side elevational view of the second embodiment.
Figure 9:
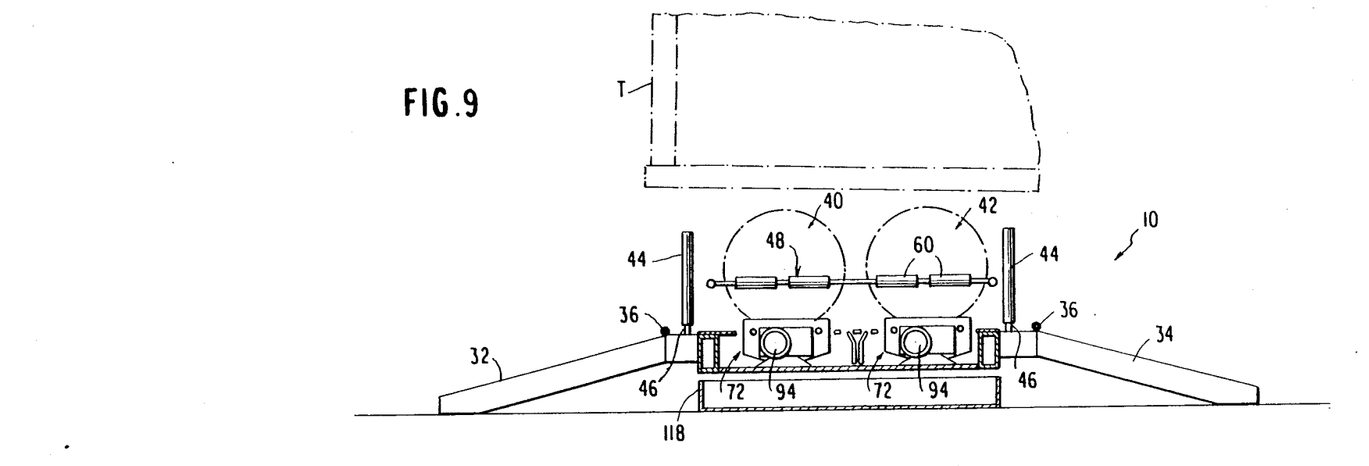
FIG. 9 is a transverse sectional view taken along line 9—9 of FIG. 7.

The rotary truck tire washing apparatus generally designated at 10 in FIGS. 7–9 essentially comprises a conventional flat top trailer body 12 (known as a "lowboy" trailer) which has been modified to accommodate the components of the tire washing system.

As best shown in FIG. 8, the trailer 12 comprises a low profile flat bed 14 occupying most of the trailer's length. Bed 14 is connected at the rear of the trailer to an elevated section 16 supported by a pair of tires 18. At the opposite front end, there is a goose neck 20 comprising a fifth-wheel coupling schematically shown at 22.

Provided at 24 and 26 are hydraulically operated outriggers, each of which comprises an hydraulic cylinder 28 and a downwardly extendable piston rod 30 and which operates to stabilize the trailer assembly.

Another modification of the trailer body, includes a pair of access ramps 32 and a pair of exit ramps 34, as best shown in FIGS. 7, 8 and 9. As shown schematically at 36 in FIG. 9, ramps 32, 34 are preferably pivotally attached to the sides of the flat elongated bed 14.

Pivots 36 allow ramps 32, 34 to accommodate variations in the ground configuration. They also allow the ramps to be folded inwardly and upwardly when the trailer is moved from one construction site to another.

In FIG. 8 and FIG. 9 a truck body T is represented in phantom lines with its rear pairs 40, 42 of tires resting in the central portion of the bed 14. As clearly apparent in FIG. 8, the distances between the ramps of each pair of ramps 32, 34 are such as to accommodate the spacing between the tire pairs 40, 42. A further modification of the trailer 12 consists of providing protection gates 44 as shown in FIGS. 7, 8 and 9. Pivotably mounted on respective vertical shafts 46, these gates can be manually positioned as shown in FIGS. 8 and 9, so that they isolate the area where the tire washing will take place.

To prevent sideway displacement of the truck body during the tire washing cycle to be described, centering roller assemblies 48, 50 are provided. Both assemblies 48, 50 are basically of the same design. Referring to assembly 50 in FIG. 8, for example, it comprises a supporting frame 52 secured to the top of trailer bed 14. Bearings 54, integral with supporting frame 52, and bearing 56, integral with trailer body 12, carry a centering roller frame 58 in such a fashion that rollers 60 can be displaced longitudinally (as seen in FIG. 8) to come very near the outer tires of each truck axle. Displacement of rollers 60 is controlled by means of an hydraulic cylinder 62 secured to fixed frame 52 and having a piston rod 64 connected to the slidable roller-carrying frame 58.

Disposed in alignment with ramps 32, 34, are wells 70 (See FIG. 7) in the central bed portion 14. Each well 70 receives a truck wheel cradle assembly 72. In turn, each cradle assembly 72 is designed to accommodate a pair of left or right truck wheels, as best shown in FIG. 8.

Figure 10:
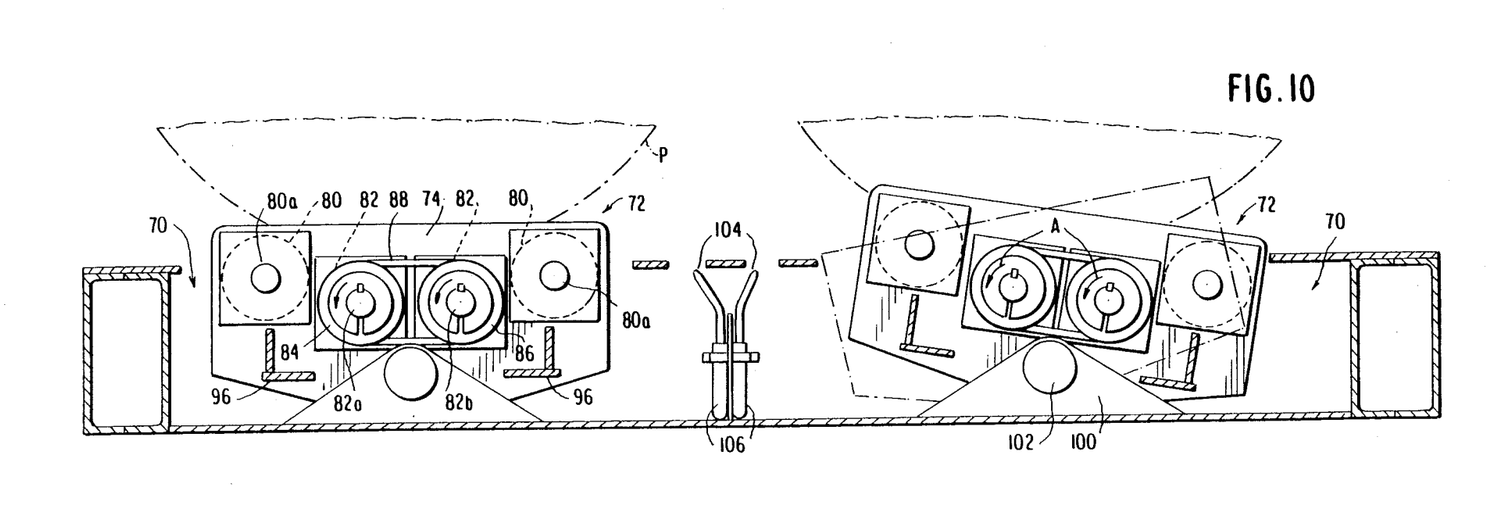
FIG. 10 is an enlarged sectional view taken along line 10—10 of FIG. 7 and showing an arrangement of supporting cradles for the truck axles.

Referring to FIG. 10, it can be seen that each cradle consists of a frame formed by side plates 74, 76 interconnected by welded members 78. Received within the space provided by side plates 74, 76 and members 78 are rollers 80 and 82 which are arranged to conform to the periphery P of the truck tires. As with the grates in the first embodiment, these rollers may have either a smooth surface or a serrated surface.

Figure 11:
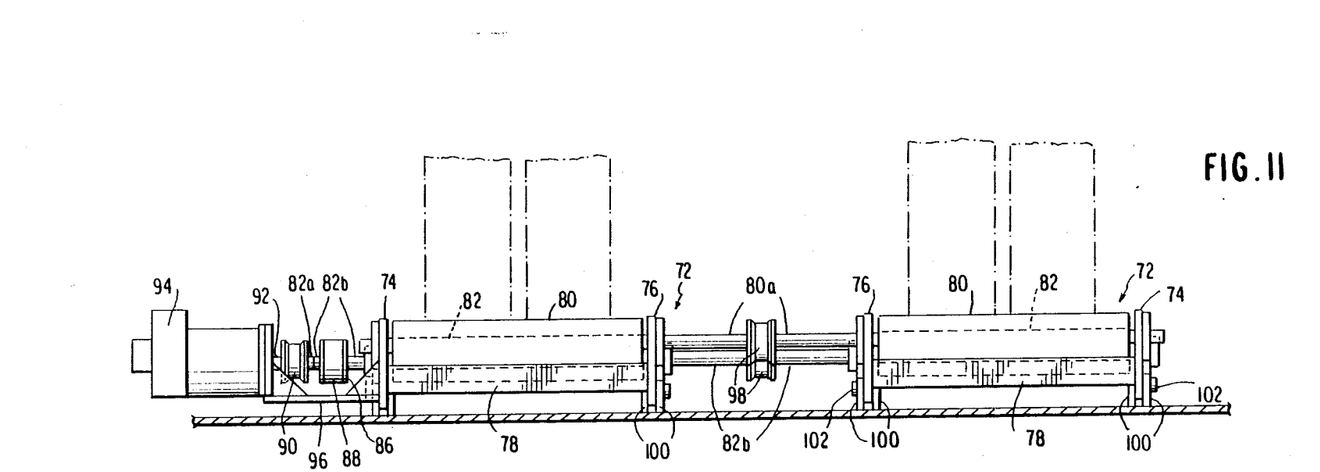
FIG. 11 is a fragmentary longitudinal section taken along line 11—11 of FIG. 7.

Free-wheeling rollers 80 are supported by shafts 80a which, in turn, are supported by side plates 74, 76. Rollers 82 are supported by shafts 82a and 82b which, in turn, are supported by side plates 74, 76. The shafts 82a, 82b are driven, as will be described hereafter, and are interconnected by means of sprockets 84, 86 and a timing belt 88. As seen in FIG. 11, the end of shaft 82a is connected by means of coupling 90 to the output shaft 92 of a hydraulic motor 94. Also shown in FIG. 11 is the hydraulic motor-mounting plate 96 welded to side plate 74. In addition, and as also shown in FIG. 11, all the shafts 80a, 82a, 82b of one cradle 72 are connected by means of couplings 98 to the shafts of the longitudinally adjacent cradle 72. Thus, when motor 94 is energized to drive shafts 82a, 82b, all four rollers 82 of the two cradles corresponding to one truck axle are rotated in the direction of arrows "A".

Further shown on the right side of FIG. 10 is the manner in which the cradles 72 are mounted onto the trailer bed. Pairs of brackets 100 welded to the trailer floor are disposed on either side of the side plates 74, 76 (FIG. 11). Pins 102 allow rocking displacement of cradles 72 in order to facilitate either the access or the exit of the truck tires, and to accommodate possible slight variations of the distance between truck axles.

Shown in detail in FIG. 10 (and schematically in FIG. 7) is the location of jets 104 for directing pressurized water onto the truck tires. Jets 104 are connected by means of high pressure hoses 106 to a pump 108 driven by motor 110. Pump 108 is connected to water tank 114 by way of a filter 112. Make-up water can be supplied by means of coupling 116 to water tank 114. As seen in FIG. 8, a water reclamation pan 118 is disposed underneath the trailer bed 14 and is connected by means of hose 120 to the source of pressurized water As schematically shown in FIGS. 7 and 8, a power source 122, formed by a diesel engine 124 and hydraulic pumps 126, 128, supplies hydraulic power to the different motors and cylinders of the system through a control panel 130.

In operation, truck T is driven to the position shown in FIG. 9 while motors 94 are deenergized; the protection gates are swung into the position shown in FIGS. 8 and 9; the truck drive is placed in "neutral"; and motors 94 are energized while water jets 104 are supplied with pressurized water. At the end of the washing cycle, motors 94 are deenergized (prevented from rotating), thereby allowing Truck T to be driven down ramps 34.

The additional embodiments described hereafter constitute modifications of the second embodiment of the invention, i.e. the portable tire-washing apparatus described above and illustrated in FIGS. 7 through 11. These additional embodiments contain elements which are either identical or very similar to those of the second embodiment and which will not again be described in detail. It will become apparent that one main concern in designing these additional embodiments was to reduce the cost and overall weight of the respective apparatuses, while at the same time improving their portability.

In the embodiment of FIG. 12 through FIG. 15, there is shown a truck tire-washing apparatus 10' having a flat top trailer body bed 12', supported at its rear end by a pair of axles on which the tires 18 are mounted, and provided at its opposite front end with the goose neck 20 having the fifth wheel coupling shown schematically at 22. To assist in the coupling of the goose neck 20 to a tractor (not shown), a pair of manually operated jacks 23 may be installed at the front end of body bed 12'.

In a manner similar to the second embodiment (FIGS. 7-11), four hydraulic jacks 24 are provided and are preferably located in the center portion of the bed 12' where the weight concentration is the greatest. Installed adjacent each of the four hydraulic jacks 24 is a mechnical jack 25 including: a short sleeve 25a secured to the top of the frame constituting the bed 12'; a length of tubing 25b; a resting pad 25c secured at the lower end of tubing 25b; and a removable pin 25d received in a hole, provided in short sleeve 25a, and also in one of a series of holes provided in tubing 25b. A pair of jacks 25 is also provided at the rear of bed 12'.

Before the beginning of tire-washing operations, bed 12' is raised slightly off the ground using hydraulic jacks 24. This operation is performed to allow the proper leveling of bed 12' and to decrease some of the weight applied to the rear axles carrying wheels and the tires 18. Once the proper leveling of bed 12' is obtained, pads 25c are lowered, and pins 25d are reinserted, thus again locking tubes 25c and permitting the hydraulic pressure to jacks 24 to be cut off.

Figure 12:
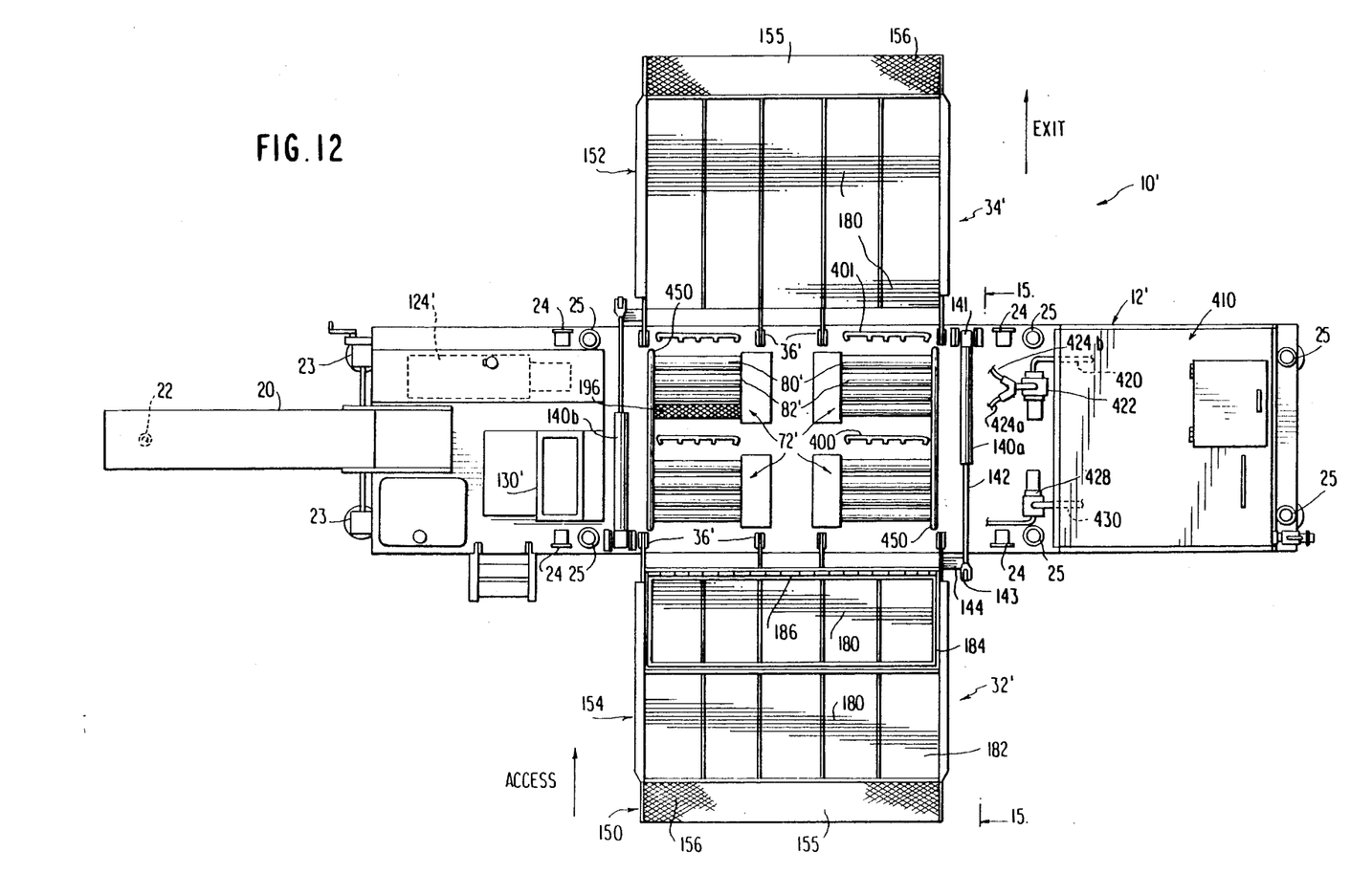
FIG. 12 is a top plan view of a third embodiment including a portable tire washing apparatus.
Figure 13:
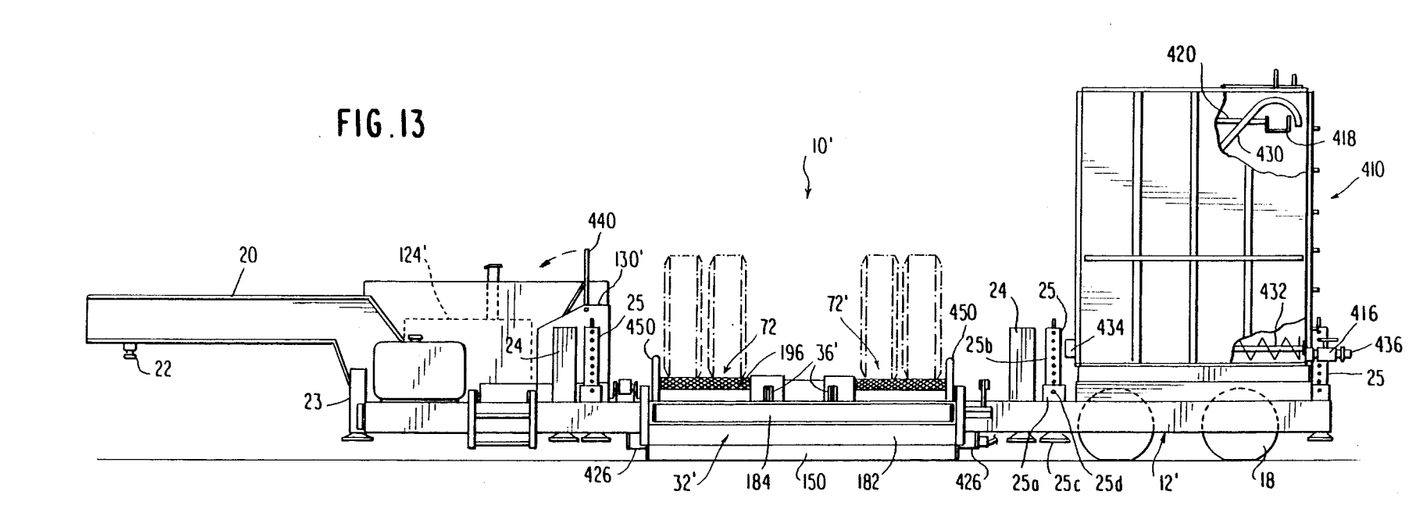
FIG. 13 is a side elevational view of the third embodiment.
Figure 14:
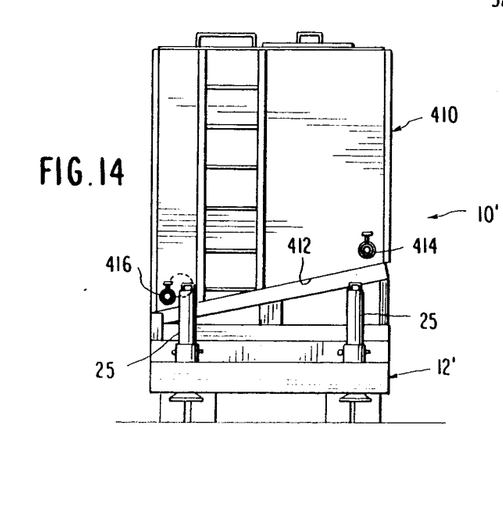
FIG. 14 is a right end view of FIG. 13.
Figure 15:
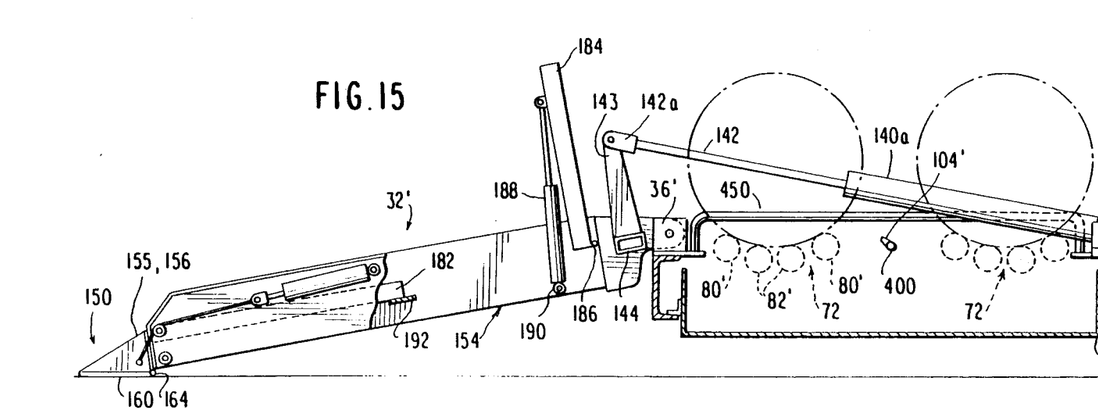
FIG. 15 is a transverse sectional view taken along line 15—15 of FIG. 12.
Figure 15A:
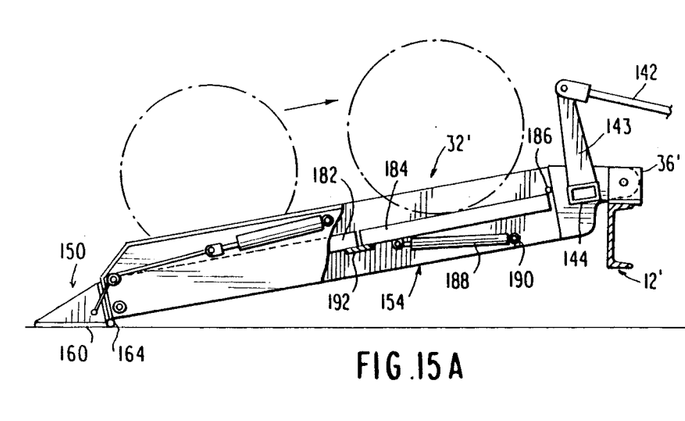
FIGS. 15A, 15B are fragmentary views of FIG. 15 showing the components in a different position.
Figure 15B:
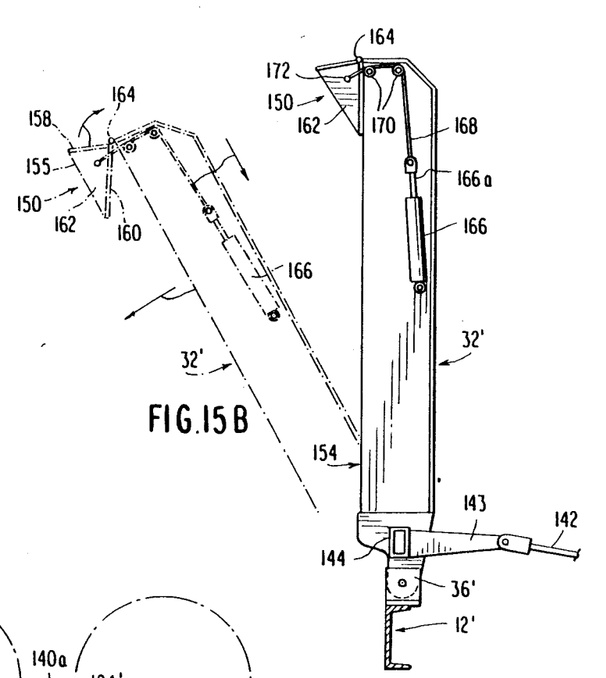

As shown in FIG. 12, and in more detail in FIGS. 15, 15A and 15B, access and exit ramps are provided as before. However, in the embodiment of FIG. 12, there are only two wide ramps 32' and 34' each of which extends laterally a distance slightly greater than the width of the axles of the truck whose tires are to be washed; said width being measured between outer surfaces of the left most and right most tires on an axle.

Ramps 32' and 34' are pivotably attached as at 36' to the sides of flat bed 12', and they can be moved from a lowered position (FIGS. 12, 15, 15A), when the apparatus is in operation, to a substantially vertical position (FIG. 15B) when the apparatus is in a travel position for being moved from one construction site to another.

As best shown in FIGS. 12 and 15, hydraulic cylinders 140a and 140b, extending transversely of bed 12', operate the raising and lowering of ramps 32' and 34'. Hydraulic cylinder 140a is pivotably secured at 141 to the top of the side of bed 12', opposite the side to which ramp 32' is mounted. Piston 142 is secured by a clevis 142a to an arm 143 welded to a short post 144 extending outwardly from the frame structure of ramp 32'. As the piston within cylinder 140a is retracted, piston rod 142 will move ramp 32' about pivot 36' from the position shown in FIGS. 15, 15A identical to that of ramp 32' and need not be separately described.

Both ramps 32' and 34' have a nose section (generally indicated at 150) and main sections 152, 154. Both nose sections are triangular in shape, as viewed from the side (FIG. 15), to facilitate both a truck's access onto the main section of ramps 32' and also its exiting from ramp 34' Each nose section consists of three plates 155, 158 and 160 which extend laterally the width of the access and exit ramps and which are welded to triangular side plates 162. Plate 155 is covered, as shown at 156 (FIG. 12), with non-flattened expanded metal to improve traction Each nose section is secured, by means of a hinge 164, to the outer end of the corresponding main section of ramps 32', 34'.

As shown in FIG. 15B, when the apparatus is in the travel position, nose section 150 will hang on the outer side of ramp 32' which may have been anchored in this vertical position, by means not shown, in order to release pressurization of cylinder 140a.

As shown in FIGS. 15 through 15B, a small hydraulic cylinder 166 is mounted on the side of ramp 32'. At the outer end of piston rod 166a, a length of cable 168 is connected at 172 to side plate 162 of nose section 150. Cable 168 is wound about two small free-wheeling pulleys 170.

At the construction site, once bed 12' has been properly leveled and jacks 25 secured, access and exit ramps 32', 34' may be lowered.

Prior to lowering the ramp 32', or while it is being lowered, but, in any event before ramp 32' contacts the ground, cylinder 166 is actuated to pivot the nose section 150 clockwise (as seen in FIG. 15B) to bring plate 158 into the vicinity of the front of the ramp.

As can be seen in FIGS. 15 and 15A, when the ramp is fully lowered, plate 160 of nose section 150 will act as a resting pad supporting the outer end of the ramp, at which time pressurization of cylinder 166 can be stopped.

As shown in FIG. 12, the main section 152 of exit ramp 34' consists of a frame structure supporting a grating, preferably made of bars 180 having serrated top edges (as previously described in relation to FIG. 6), which grating extends uniformly from the edge of bed 12' to the nose section 150.

By contrast, the main section 154 of access ramp 32' consists of two subsections 182 and 184. Subsection 182 is fixed, has a grating made of bars 180, and extends from the nose section 150 to about half way up ramp 32'. Subsection 184, also consisting of a grating arrangement of bars 180, is pivotably secured to a transverse member at the top of ramp 32' by means of hinge 186. A hydraulic cylinder 188, attached to the frame of ramp 32' at 190, controls the displacement of subsection 184 from the position shown in FIG. 15A to the position shown in FIG. 15. In FIG. 15A both subsections 182 and 184 are in alignment, thus allowing passage of the truck wheels. Subsection 184 is shown resting on a transverse stop member which is schematically illustrated at 192.

Once the truck wheels have moved to the position shown in FIG. 15, subsection 184 is extended to a nearly vertical position where it will act as a protective shield to catch any debris that could be projected rearwardly of the truck during the tire washing operation.

Truck wheel cradles 72', identical to the cradles 72 described previously and illustrated in detail in FIGS. 10 and 11, are located in the center area of the bed 12'. Each cradle contains a plurality of rollers 80', 82' arranged to conform to the periphery of the truck tires. Rollers 82' are driven by means identical to those shown in FIGS. 10 and 11. In order to improve the traction between the truck tires and rollers 80', 82', the latter are enrolled in cylindrical sleeves 196 of expanded metal (FIG. 12).

As previously provided, banks 400 and 401 of jets 104' are located (as best shown in FIGS. 12 and 15) in a position slightly ahead of the truck axles for directing pressurized water onto the truck tires.

To prevent sideway displacement of the truck body during the tire-washing cycle, bumpers 450 are installed on either side of the cradle assemblies. As shown in FIG. 15, bumpers 450 consist of inverted U-shaped tubular rails fixed to, and extending transversely of, the bed 12'.

In the third embodiment of FIGS. 12 through 15, a water supply tank 410 is mounted at the rear of bed 12'. Tank 410 has an inclined bottom 412, a water inlet valve 414 and a discharge valve 416. At the beginning of the tire-washing operation, tank 410 is first filled to capacity with water. A submerged water-pickup box 418, located at the top of the tank 410, allows the withdrawal of water through line 420. Water pressurizing pump 422 is connected to line 420 and directs pressurized water to the jet ramps 400, 401 by way of high pressure hoses 424a, 424b. Spent water and debris resulting from the tire-washing are collected in a pan 426 located below the cradle assemblies 72'. A pump 428 collects, continuously or periodically, the waste water accumulated in collection pan 426 to send it back to tank 410 via line 430. As consecutive washing cycles are performed, debris will tend to accumulate in the lowest area of the inclined bottom 412. An auger, schematically shown at 432 and operated by hydraulic motor 434, assists in the periodical removal of the accumulated debris through valve 416. Quick disconnect coupling 436 allows the connection- of valve 416 to a hose (not shown) leading to a settling pond or to an apparatus-for treating and disposing of the evacuated waste water. After this flushing operation is performed, valve 414 is opened to supply make-up water to tank 410.

As in the second embodiment of the invention, a diesel engine 124', hydraulic pumps, a fuel supply tank, an oil tank and filters are again provided for supplying power to the motors and cylinders of the system through a control console 130'. In this third embodiment, console 130' is equipped with a transparent cover 440 which acts as a protective shield, when opened, to allow access to the control levers and switches inside console 130'.

Figure 16:
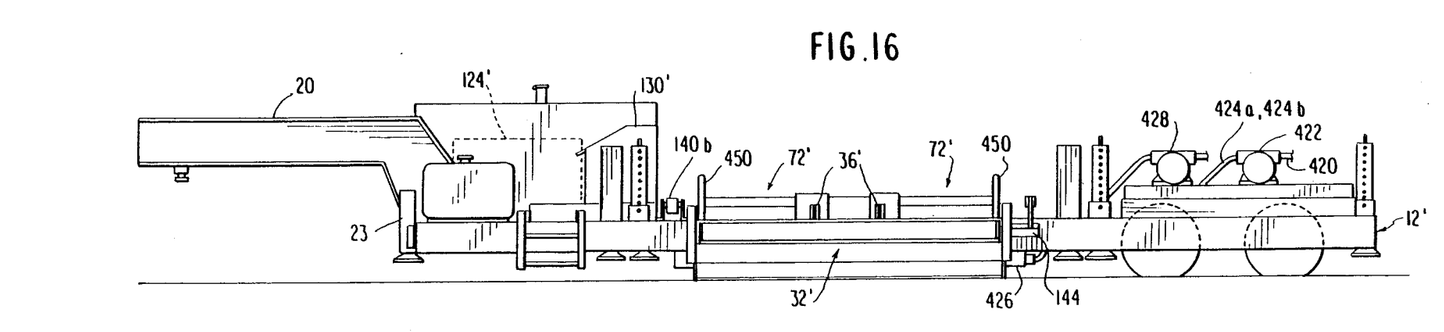
FIG. 16 is a side elevational view of a fourth embodiment.
Figure 17:
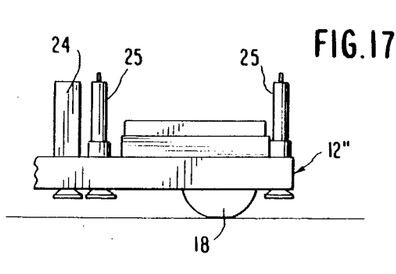
FIG. 17 is a fragmentary view of FIG. 16 showing a modification of the fourth embodiment.

The fourth embodiment of the invention, as generally indicated at 10" (FIG. 16), is identical in every aspect to the third embodiment 10' (FIGS. 12-15), except that the fourth embodiment does not include a water supply and recycling tank 410. Instead, the inlet of pressurizing pump 422 is connected directly to an outside source such as a pond or a city water supply line. Pumps 422, 428 have been shown relocated at the rear of bed 12' for the purpose of illustration only. As a result of the elimination of tank 410, a noticeable reduction of the weight of the apparatus is obtained, thereby allowing a simpler construction design and the use of lighter materials, all of which translates into further weight reduction. For instance, as illustrated in FIG. 17, the trailer bed 12" is shown as having been shortened, and it is supported by only a single axle of wheels 18.

Figure 18:
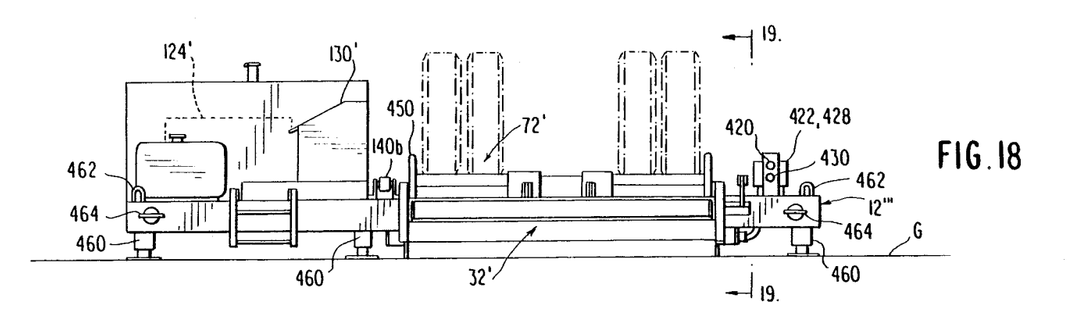
FIG. 18 is a side view of a fifth embodiment.
Figure 19:
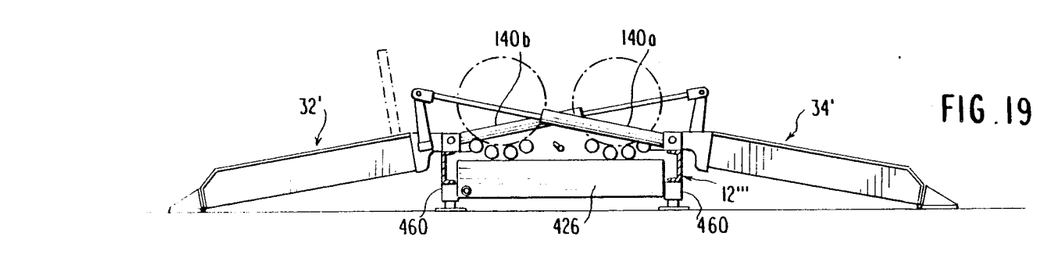
FIG. 19 is a transverse sectional view taken along line 19—19 of FIG. 18.

A fifth embodiment of the invention is shown in FIGS. 18 and 19. It comprises all the equipment and accessories which are necessary for accomplishing the truck-tire washing operation, and which are mounted on a platform 12''' of reduced longitudinal dimension. Platform 12''' rests on the ground G which has been leveled prior to installation of the apparatus. Posts 460 are provided to properly support platform 12'''; these posts may be contacting concrete blocks (not shown) initially poured in the ground at locations matching the locations of the posts.

As disclosed in FIGS. 18 and 19, platform 12''' does not include either a goose neck at the front or a set of axles at the rear. When the apparatus is moved to another location, ramps 32' and 34' are moved to their upward position and, by means of lifting eyes 462, platform 12''' is lifted off the ground onto a conventional flat bed trailer body. During operation, shackles 464 may be used to anchor the platform 12''' to the ground to prevent any sliding motion which could result from the passage of trucks across the platform.

Figure 20:
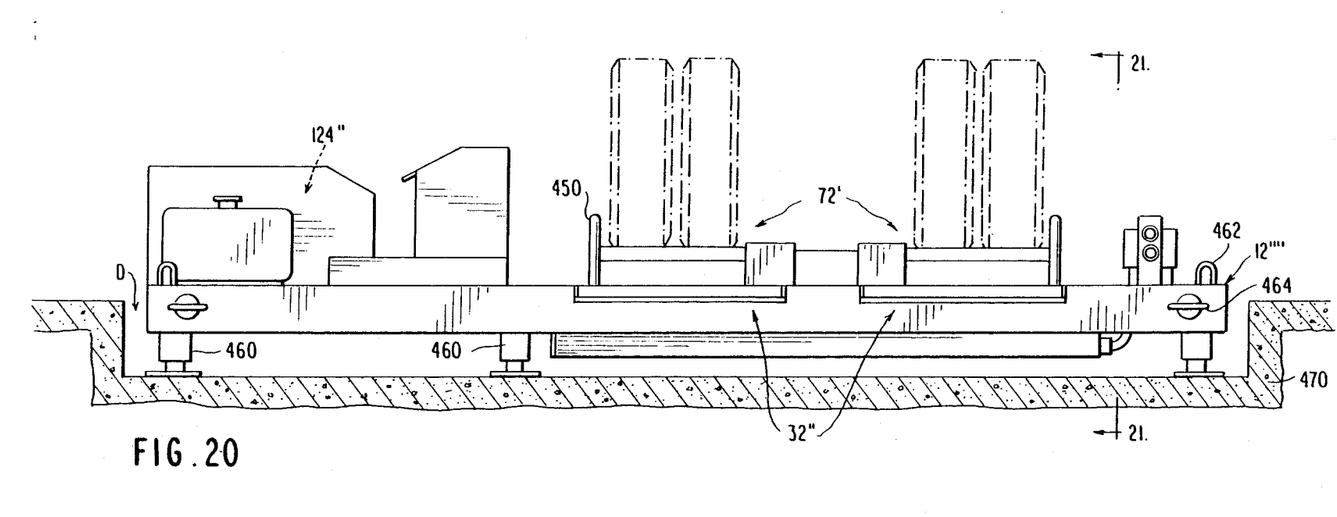
FIG. 20 is a side elevational view of a sixth embodiment.
Figure 21:
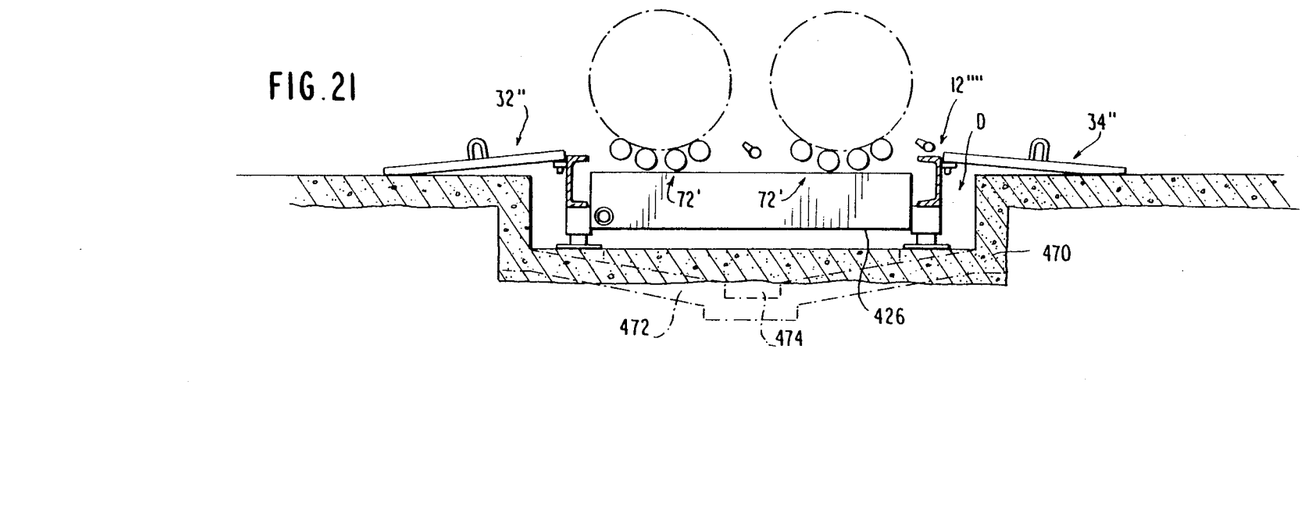
FIG. 21 is a transverse sectional view taken along line 21—21 of FIG. 20.

A sixth and last embodiment of the invention is illustrated in FIGS. 20 and 21 and is basically identical to the embodiment of FIGS. 18 and 19, except that the hydraulically foldable access and exit ramps 32', 34' have been replaced by two pairs 32" and 34" of manually removable ramps. Since the mounting platform 12'''' is intended to rest in a shallow depression D dug in the ground, the access and exit ramp pairs 32" and 34" are constructed to be considerably shorter than ramps 32' and 34'. Additionally, as shown best in FIG. 20, each ramp of a pair 32" or 34" is of a width necessary to accommodate the width of one pair of truck tires, as disclosed above in connection with the embodiment of FIGS. 7–11. The elimination of the means for operating the access and exit ramps, combined with the use of lighter access and exit ramps, results in a diminution of the overall weight of the apparatus. Since power requirements also are decreased accordingly, a smaller diesel engine 124" may be used.

As shown in phantom lines in FIG. 21, in-ground depression D, preferably lined with concrete walls 470, may also have a sloped bottom wall 422 containing a well 474 for removal of the waste water and debris not caught by collection pan 426 o for the removal of all waste water and debris in the case where the collection pan 426 is eliminated for weight and cost considerations.

What is claimed is:

1. A portable tire washing apparatus for washing tires on a vehicle, said apparatus comprising:
a portable support member which has a longitudinal and a transverse dimension;
vehicle entrance and exit ramps pivotably mounted on opposite transverse sides of said support member so that said ramps are movable between an operational outwardly extending ground-contacting position and a non-operational generally upwardly extending travel position;
at least two longitudinally spaced, tire-rotating, drivable roller cradle assemblies mounted on said support member so that they are in transverse alignment with said ramps in the operational position thereof, each of the cradle assemblies containing a transverse space;
liquid spraying means mounted in the transverse space;
means for driving the rollers of said cradle assemblies while liquid is supplied to said spraying means; and
means for mounting said cradle assemblies for rocking movement about axes extending in the longitudinal direction of said support member.

2. An apparatus as defined in claim 1, wherein said support member comprises a platform.

3. An apparatus as defined in claim 2, wherein said platform comprises the bed of a towable wheeled trailer.

4. An apparatus as defined in claim 1 or 2, wherein said ramps are removably mounted on said support member.

5. An apparatus as defined in claim 1, wherein the drivable rollers have a smooth surface.

6. An apparatus as defined in claim 1, wherein the drivable rollers are enrolled in cylindrical sleeves of expanded metal.

7. An apparatus as defined in claim 1, further comprising respective guide means, mounted adjacent said cradle assemblies, for preventing sideway displacement, in the longitudinal direction, of tires supported on said cradle assemblies.

8. An apparatus as defined in claim 7, wherein said guide means comprises tire-alignment roller assemblies mounted on said support member and disposed on transversely opposite sides of said cradle assemblies.

9. An apparatus as defined in claim 7, wherein said guide means comprises upwardly extending bumpers mounted on said support member and disposed on transversely opposite sides of said cradle assemblies.

10. An apparatus as defined in claim 1, 5, or 7, further comprising a ground-contacting nose portion pivotably connected to a free end of each ramp, and hydraulic means for moving said nose portion between an extended ground-contacting position in said operational position and a retracted position in said travel position.

11. An apparatus as defined in claim 1, further comprising four pivotably mounted protection gates for enclosing the area in which said cradle assemblies are disposed, when tires are being rotated and sprayed.

12. An apparatus as defined in claim 1, wherein each of said ramps comprises two sections and means for pivotably interconnecting said sections sot that one of said sections is elevatable, during a tire-washing operation, to form an upright protection shield for an area enclosing said cradle assemblies.

13. An apparatus as defined in claim 1, further comprising jack means, mounted on said support member, for leveling said support member relative to a ground surface on which said vehicle enters and exits said apparatus via said entrance and exit ramps, respectively.

14. An apparatus as defined in claim 1, further comprising: tank means, mounted on said support member, for storing liquid; pump means for supplying the stored liquid to said liquid spraying means; collecting means for collecting debris-containing liquid resulting from washing of the tires; and liquid-recycling means for removing debris from the liquid and returning clean liquid to said tank means.

15. An apparatus as defined in claim 1, further comprising: conduit means, coupled to said liquid spraying means, for supplying liquid to said spraying means; and coupling means, connected to said conduit means, for coupling said conduit means to an external source of liquid.

* * * * *